(12) United States Patent
Baldwin

(10) Patent No.: US 7,887,011 B1
(45) Date of Patent: Feb. 15, 2011

(54) APPARATUS AND METHODS FOR CARRYING AIRBORNE CARGO

(76) Inventor: G. Douglas Baldwin, 4 Harborview Rd., Port Washington, NY (US) 11050-1440

( * ) Notice: Subject to any disclaimer, the term of this patent is extended or adjusted under 35 U.S.C. 154(b) by 652 days.

(21) Appl. No.: 12/016,922

(22) Filed: Jan. 18, 2008

Related U.S. Application Data

(60) Provisional application No. 60/881,361, filed on Jan. 18, 2007.

(51) Int. Cl.
*B64D 1/08* (2006.01)
(52) U.S. Cl. ................ 244/137.4; 244/118.1; 294/68.1
(58) Field of Classification Search ............. 244/118.1, 244/137.1, 2, 119, 173.1, 127, 137.4, 901, 244/118.2, 137.2; 294/68.2, 68.1, 81.1, 67.1; 414/540, 545
See application file for complete search history.

(56) References Cited

U.S. PATENT DOCUMENTS

| | | | |
|---|---|---|---|
| 2,448,862 A | 9/1948 | Conklin | |
| 3,176,940 A | 4/1965 | Echevarria, Jr. | |
| 3,212,737 A * | 10/1965 | Katzenberger | 244/137.1 |
| 3,358,950 A * | 12/1967 | Welsch et al. | 244/137.2 |
| 3,478,906 A * | 11/1969 | Smith | 414/411 |
| 3,601,342 A | 8/1971 | Piasecki | |
| 3,966,144 A * | 6/1976 | Gabriel | 244/17.11 |
| 4,895,321 A | 1/1990 | Huhn et al. | |
| 5,344,203 A * | 9/1994 | Tollenaere | 294/68.1 |
| 5,732,904 A * | 3/1998 | Rieger | 244/1 R |
| 6,003,782 A | 12/1999 | Kim et al. | |
| 6,039,385 A | 3/2000 | Husted | |
| 6,189,834 B1 | 2/2001 | Dietz et al. | |
| 6,783,096 B2 | 8/2004 | Baldwin | |
| 6,845,939 B1 * | 1/2005 | Baldwin | 244/7 R |
| 6,986,484 B2 | 1/2006 | Scott | |
| 7,059,562 B2 | 6/2006 | Baldwin | |
| 7,070,145 B2 | 7/2006 | Baldwin | |

* cited by examiner

*Primary Examiner*—Timothy D Collins
*Assistant Examiner*—Brian M O'Hara
(74) *Attorney, Agent, or Firm*—Louis J. Hoffman; David S. Alavi

(57) ABSTRACT

An airborne cargo-carrying apparatus includes support and lower structural frames; a retaining mechanism securing a cargo carrier to the support frame; collapsible nose and tail cones coupled to the frames; flexible side panels coupled to the cones and frames; and a cargo door mounted on the lower structural frame. The support frame includes a top panel. The cones and panels are arranged—with the cones collapsed, side panels folded, and cargo door open—to enable the support frame and the cargo carrier to be secured together with the retaining mechanism engaged. The cones, panels, and cargo door are arranged—with the cones expanded, side panels unfolded, and cargo door closed—to substantially envelop the cargo carrier secured to the support frame within an aerodynamic enclosure.

19 Claims, 11 Drawing Sheets

APPARATUS AND METHODS FOR CARRYING AIRBORNE CARGO

BENEFIT CLAIMS TO RELATED APPLICATIONS

This application claims benefit of U.S. provisional App. No. 60/881,361 filed Jan. 18, 2007 in the name of G. Douglas Baldwin, which provisional application is hereby incorporated by reference as if fully set forth herein.

BACKGROUND

The field of the present invention relates to aircraft cargo-carrying systems and methods. In particular, apparatus and methods are disclosed herein for carrying airborne cargo with hover-capable (i.e., VTOL) aircraft.

A wide variety of cargo-carrying systems are available for aircraft. Some of these are described in:

U.S. Pat. No. 6,783,096 entitled "Vertical lift flying craft" issued Aug. 31, 2004 to Baldwin, hereby incorporated by reference;

U.S. Pat. No. 6,845,939 entitled "Tailboom-stabilized VTOL aircraft" issued Jan. 25, 2005 to Baldwin, hereby incorporated by reference;

U.S. Pat. No. 7,070,145 entitled "Tailboom-stabilized VTOL aircraft" issued Jul. 4, 2006 to Baldwin, hereby incorporated by reference;

U.S. Pat. No. 2,448,862 entitled "Cargo-carrying airplane" issued Sep. 7, 1948 to Conklin;

U.S. Pat. No. 3,176,940 entitled "Helicopter pod positioning and supporting means" issued Apr. 6, 1965 to Echeverria;

U.S. Pat. No. 3,601,342 entitled "Cargo hoist system for helicopters" issued Aug. 24, 1971 to Piasecki;

U.S. Pat. No. 4,895,321 entitled "Helicopter truck dolly" issued Jan. 23, 1990 to Huhn et al;

U.S. Pat. No. 5,344,203 entitled "Aerodynamically-stabilized collapsible personnel and cargo basket for helicopters" issued Sep. 6, 1994 to Tollenaere;

U.S. Pat. No. 6,003,782 entitled "Aerial spray system" issued Dec. 21, 1999 to Kim et al;

U.S. Pat. No. 6,039,385 entitled "Retractable air deflector for a vehicle" issued Mar. 21, 2000 to Husted;

U.S. Pat. No. 6,189,834 entitled "Collapsible cargo management system for transporting payloads suspended from aircraft" issued Feb. 20, 2001 to Dietz et al;

U.S. Pat. No. 6,986,484 entitled "VTOL aircraft external load drag reduction system" issued Jan. 17, 2006 to Scott; and Soviet Union Pat. Pub. No. SU-1832097-A1 entitled "Helicopter container type load external suspension system—has load cable, attached at one end to helicopter and at other end to swivel and to load attachment unit" published Aug. 7, 1993 in the names of Ishmukhametov et al.

SUMMARY

An apparatus for carrying airborne cargo comprises: (a) a support frame suspended from an aircraft; (b) at least one retaining mechanism arranged to secure a cargo carrier to the support frame; (c) a collapsible nose cone; (d) a collapsible tail cone; (e) a lower structural frame; (f) flexible side panels; and (g) at least one cargo door. The support frame includes a top panel. The nose and tail cones are coupled to front and rear ends, respectively, of the support and lower structural frames. The flexible side panels are each connected to corresponding sides of the support frame and lower structural frame and coupled to the nose and tail cones. The cargo door is mounted on the lower structural frame. The nose cone, tail cone, top panel, and side panels are arranged—with the nose and tail cones collapsed, the side panels folded, and the cargo door open—so as to enable the support frame and the cargo carrier to be relatively positioned in a secured-together fashion with the retaining mechanism engaged. The nose cone, tail cone, top panel, side panels, and cargo door are arranged—with the nose and tail cones expanded, the side panels unfolded, and the cargo door closed—so as to substantially envelop the cargo carrier secured to the support frame within an aerodynamic enclosure.

A method for carrying airborne cargo comprises: (a) positioning the support frame over the cargo carrier with the nose and tail cones collapsed, the flexible side panels folded, and the cargo door open; (b) engaging the retaining mechanism with the cargo carrier to secure the cargo carrier to the support frame; and (c) substantially enveloping within an aerodynamic enclosure the cargo carrier secured to the support frame, by expanding the nose and tail cones, unfolding the flexible side panels, and closing the cargo door. The method can further comprise: (d) exposing the cargo carrier by opening the cargo door, collapsing the nose and tail cones, and folding the flexible side panels; (e) disengaging the retaining mechanism on the support frame from the cargo carrier to release the support frame from the cargo carrier; and (f) removing the support frame from the cargo carrier.

Objects and advantages pertaining to apparatus and methods for carrying airborne cargo may become apparent upon referring to the exemplary embodiments illustrated in the drawings and disclosed in the following written description or appended claims.

Figure 1A:
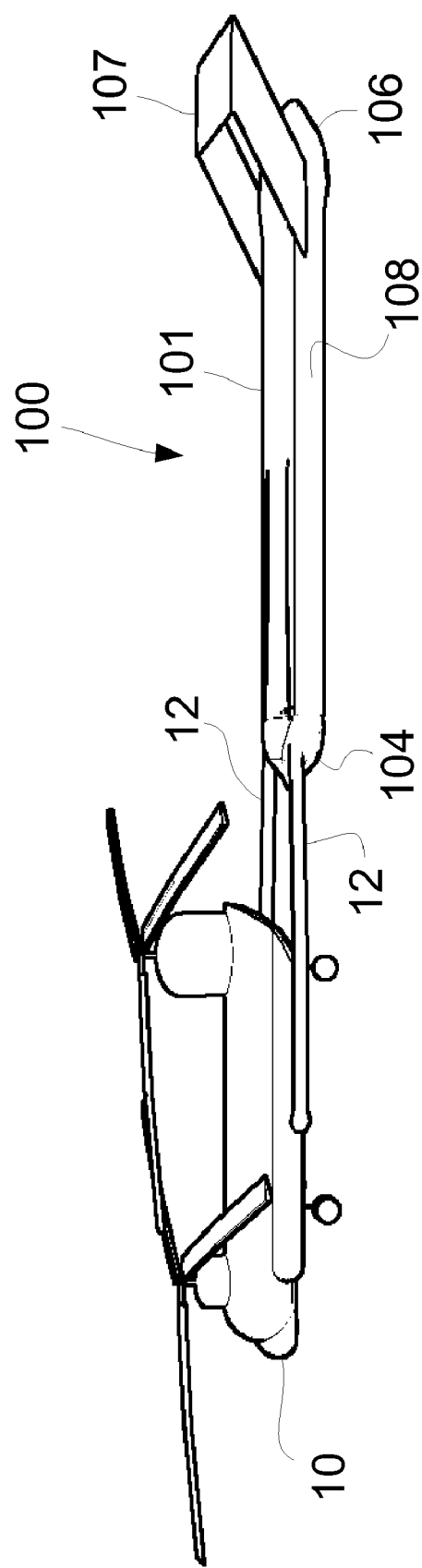
FIGS. 1A-1E illustrate schematically an exemplary sequence of capture and envelopment of an airborne cargo carrier.

The embodiments shown in the figures are exemplary and should not be construed as limiting the scope of the present disclosure or appended claims.

DETAILED DESCRIPTION OF EMBODIMENTS

FIGS. 1A-1E illustrate schematically a hovering aircraft 10 and a cargo carrier 20 during a sequence in which aircraft 10 secures, envelops, and transports cargo carrier 20. In the example shown, aircraft 10 comprises a cargo helicopter. However, any hover-capable aircraft can be employed, and some examples are disclosed in the incorporated references.

Cargo-carrying apparatus 100 comprises a support frame 102 (visible in FIGS. 4, 6, and 7; also referred to as a spreader bar), a collapsible nose cone 104, a collapsible tail cone 106, a lower structural frame 103 (visible in FIGS. 2-4), a top panel 101, flexible side panels 108, and at least one cargo door 109. The nose and tail cones 104/106 are coupled to the front and rear ends, respectively, of the support and structural frames 102/103. In a collapsed, or folded, arrangement (as in FIGS. 1A-1C), apparatus 100 can be positioned above cargo carrier 20 to enable cargo carrier 20 to be secured to support frame 102 (as described below). In an expanded, or deployed, arrangement (as in FIGS. 1D and 1E), apparatus 100 can substantially envelop cargo carrier 20 secured to support frame 102 and form an aerodynamic enclosure. Tail cone 106 can be advantageously provided with an airfoil, tail fin(s), rudder, stabilizer, or other aerodynamic stabilization structure 107. Such a structure can help maintain cargo-carrying apparatus 100 in a desired orientation during forward flight of aircraft 10.

In FIG. 1A, aircraft 10 and a cargo-carrying apparatus 100 are shown before take-off (or lift-off). Apparatus 100 (in its collapsed arrangement) is pivotably connected to aircraft 10 by a pair of rigid suspending members 12, which pivot at both their upper ends (connected to aircraft 10) and their lower ends (connected to apparatus 100). Before take-off, apparatus 100 rests on the ground behind (as in FIG. 1A) or in front of aircraft 10, with suspending members 12 pivoted into nearly horizontal positions. Upon take-off, aircraft 10 rises, and suspending members 12 pivot toward vertical. Apparatus 100 may roll on wheels or slide along the ground as aircraft 10 rises, or apparatus 100 may remain stationary as aircraft 10 rises along an arcuate path defined by the pivoting motion of suspending members 12. In either case, once suspending members 12 are substantially vertical, further elevation of aircraft 10 lifts apparatus 100 off of the ground. Suspending members 12 can be connected to aircraft 10 or support frame 102 to allow rotation in any direction, or the rotation can be constrained so that only rotation in the fore/aft direction is allowed. The latter arrangement can result in greater lateral flight stability of aircraft 10 when laden with cargo carrier 20. Any suitable or desirable coupling or connection between rigid suspending members 12 and aircraft 10 or support frame 102 can be employed. Alternatively, flexible suspending members (e.g., cables or tethers) can be employed.

Aircraft 10 is flown to the location of cargo carrier 20 and maneuvered to position apparatus 100 above cargo carrier 20. In the example shown in FIGS. 1A-1E and 2, 3, 5, and 6, cargo carrier 20 comprises an International Standards Organization (ISO) standard shipping container. Cargo carriers suitable for use with apparatus and methods disclosed herein can include, but are not limited to, ISO-standard shipping containers, military-standard containers (e.g., MILVANs), other shipping containers, military multi-function payload platforms (MPPs, as in FIG. 7), roll-on/roll-off vehicle platforms (as in FIG. 7), palletized cargo platforms (as in FIG. 7; for palletized cargo, seating, or fuel bladders), or any other suitable cargo container, platform, or carrier adapted to function with apparatus 100, as further described below. Cargo carrier 20 can be adapted or customized in any way needed or desired for a specific payload, e.g., for providing ballistic protection when transporting personnel.

Support frame 102 can be sized and adapted to hold a single cargo carrier 20 or multiple cargo carriers. Support frame 102 can be of any suitable size or arrangement, which arrangement includes the number, type, and positions of locking mechanisms for securing cargo carrier 20 to support frame 102 (example described below). For example, support frame can be either larger or smaller than the size required for carrying a standard shipping container. Payloads of up to several tons can be carried in a standard shipping container secured to the exemplary embodiment of support frame 102, or an alternative embodiment of support frame 102 can be arranged to support a cargo carrier 20 loaded with only a few hundred pounds, for example. In another example, support frame 102 can be suitably sized and arranged for carrying a single cargo carrier of a given size, for carrying multiple cargo carriers of that given size, or for carrying either a single cargo carrier of a given size or multiple cargo carriers of a smaller size (e.g., a single 40-foot ISO container versus a pair of 20-foot ISO containers).

Figure 1B:
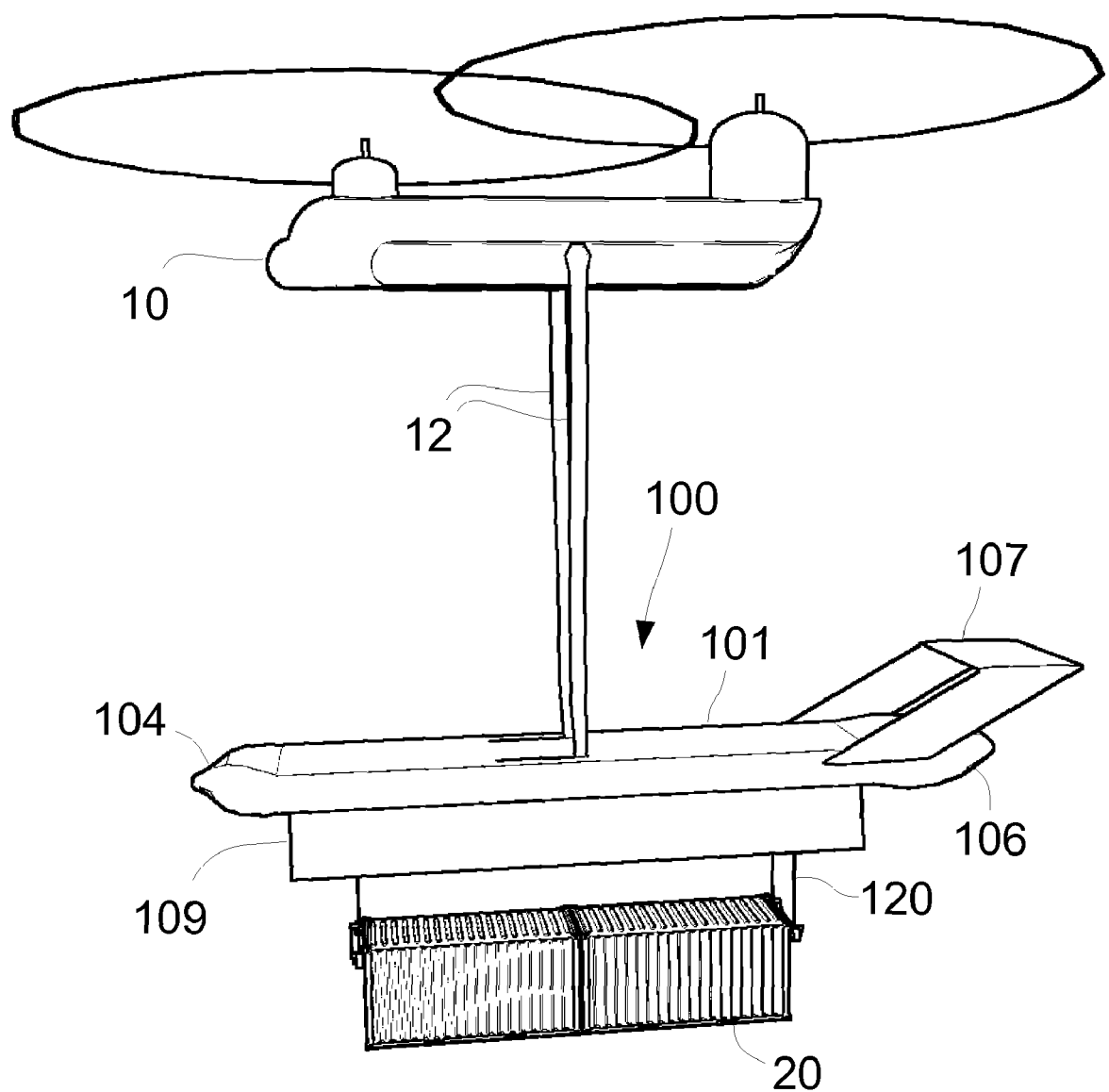
Figure 1C:
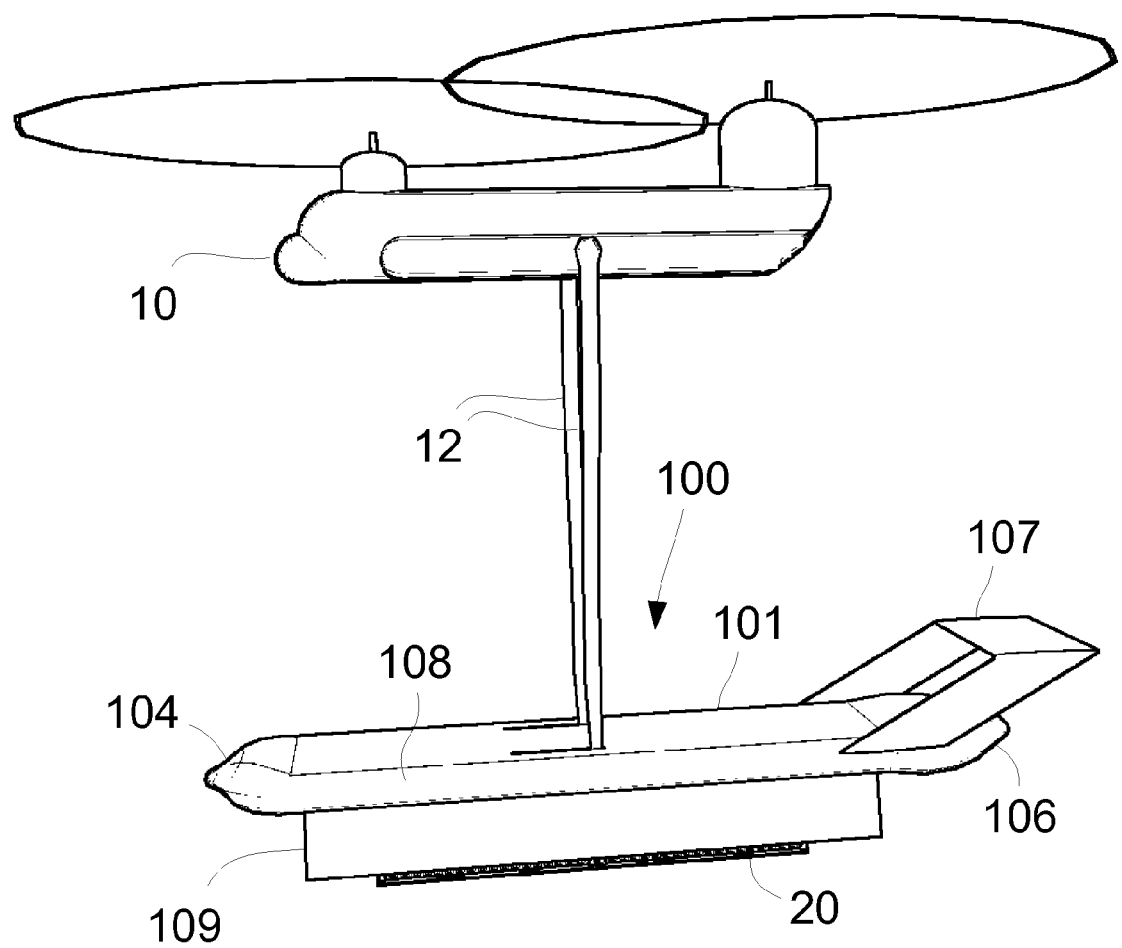

In FIG. 1B, aircraft 10 has hovered so that cargo-carrying apparatus 100 is positioned above cargo carrier 20. A plurality of cables 120 are shown connecting support frame 102 and cargo carrier 20. Cables 120 and suitable coupling and winching hardware (examples described below) can serve to pull and guide support frame 102 (and aircraft 10 along with it) down to cargo carrier 20 as it rests on the ground, or those elements can be used to hoist cargo carrier 20 up to support frame 102. Alternatively, support frame 102 can be positioned over cargo carrier 20 without using cables, e.g., by precise piloting of aircraft 10, by manual or mechanized movement of suspending members 12, by mechanical guides attached to support frame 102 or cargo carrier 20 (e.g., a funnel-like mechanism), or by guidance and placement of support frame 102 by ground personnel or equipment. Whatever the case, when cargo carrier 20 is properly positioned with respect to support frame 102 (as in FIGS. 1C and 2), they are secured together using any suitable locking mechanism or mechanisms on support frame 102 or cargo carrier 20 (example described below).

Alternatively, support frame 102 can be secured to cargo carrier 20 while aircraft 10 remains on the ground. Aircraft 10 then lifts off and lifts cargo carrier 20 secured to support frame 20.

While support frame 102 and cargo carrier 20 are being relatively positioned and secured together, nose and tail cones 104/106 are in their collapsed configurations. As a result, flexible side panels 108 are folded, and lower structural frame 103 is drawn up toward support frame 102. In that arrangement, and with cargo doors 109 opened, cargo carrier 20 is able to move into proper position to be secured to support frame 102. Lower structural frame 103 is identified in the figures with a separate numeral, but it alternatively can comprise the lower portion of a single frame in which numerals 102 and 103 are integrated together, or a rigid part of cargo doors 109 or a lower covering panel that is not a "frame" comprised of bars or beams. The term "lower structural frame" is intended broadly enough to encompass all such alternatives and others that represent the lower portion of the cargo carrier structure.

Figure 1D:
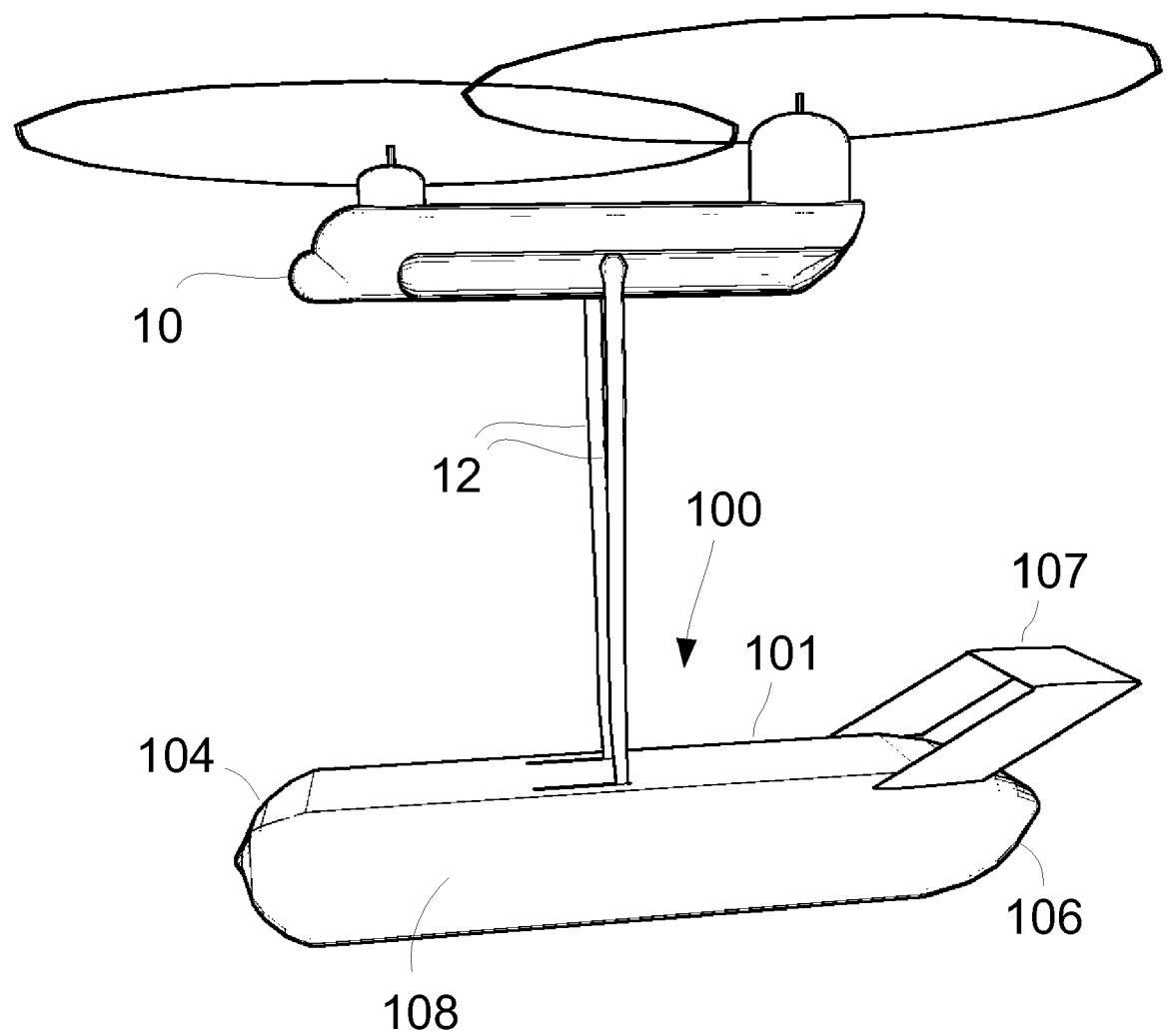
Figure 1E:
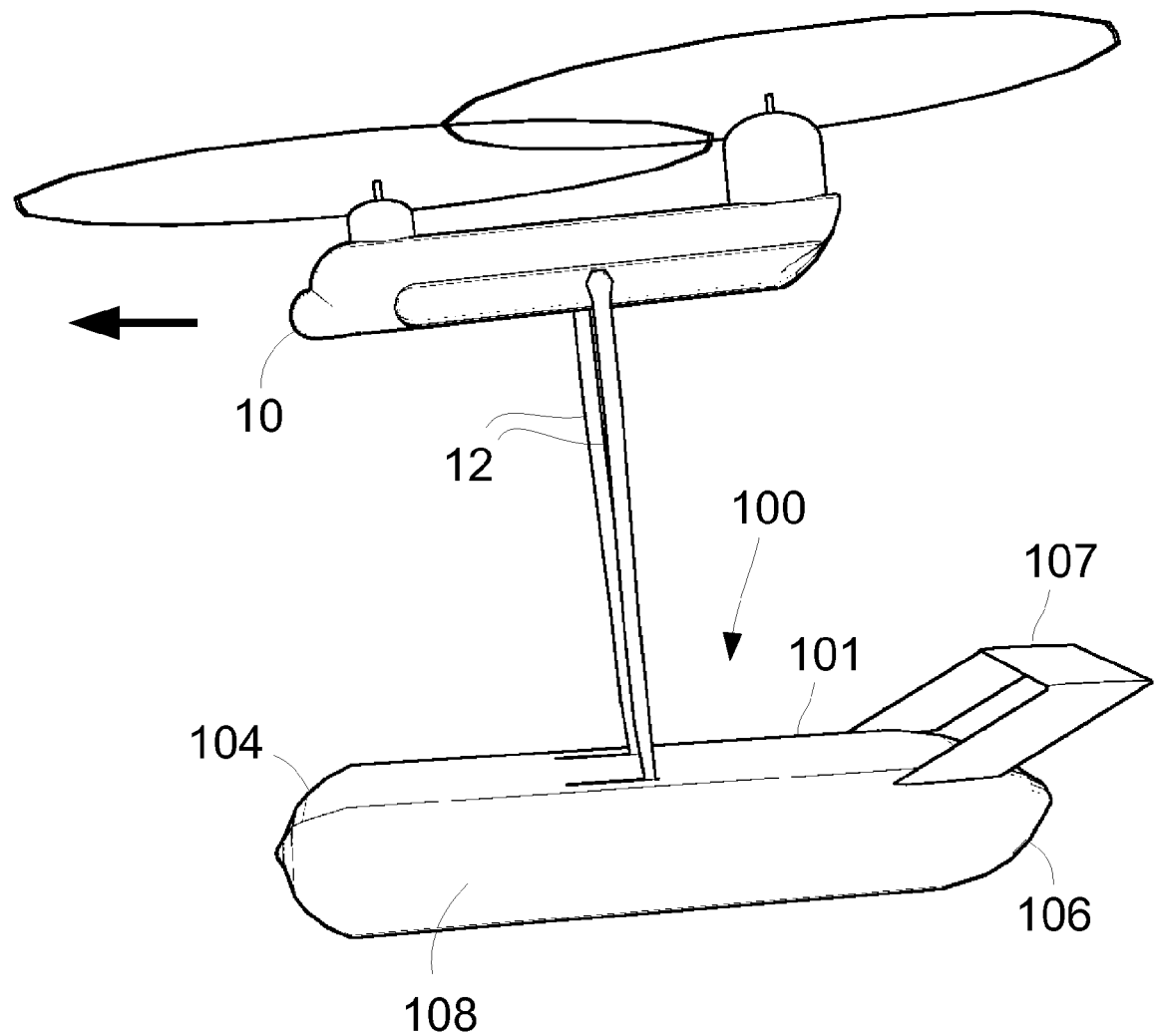
Figure 3:
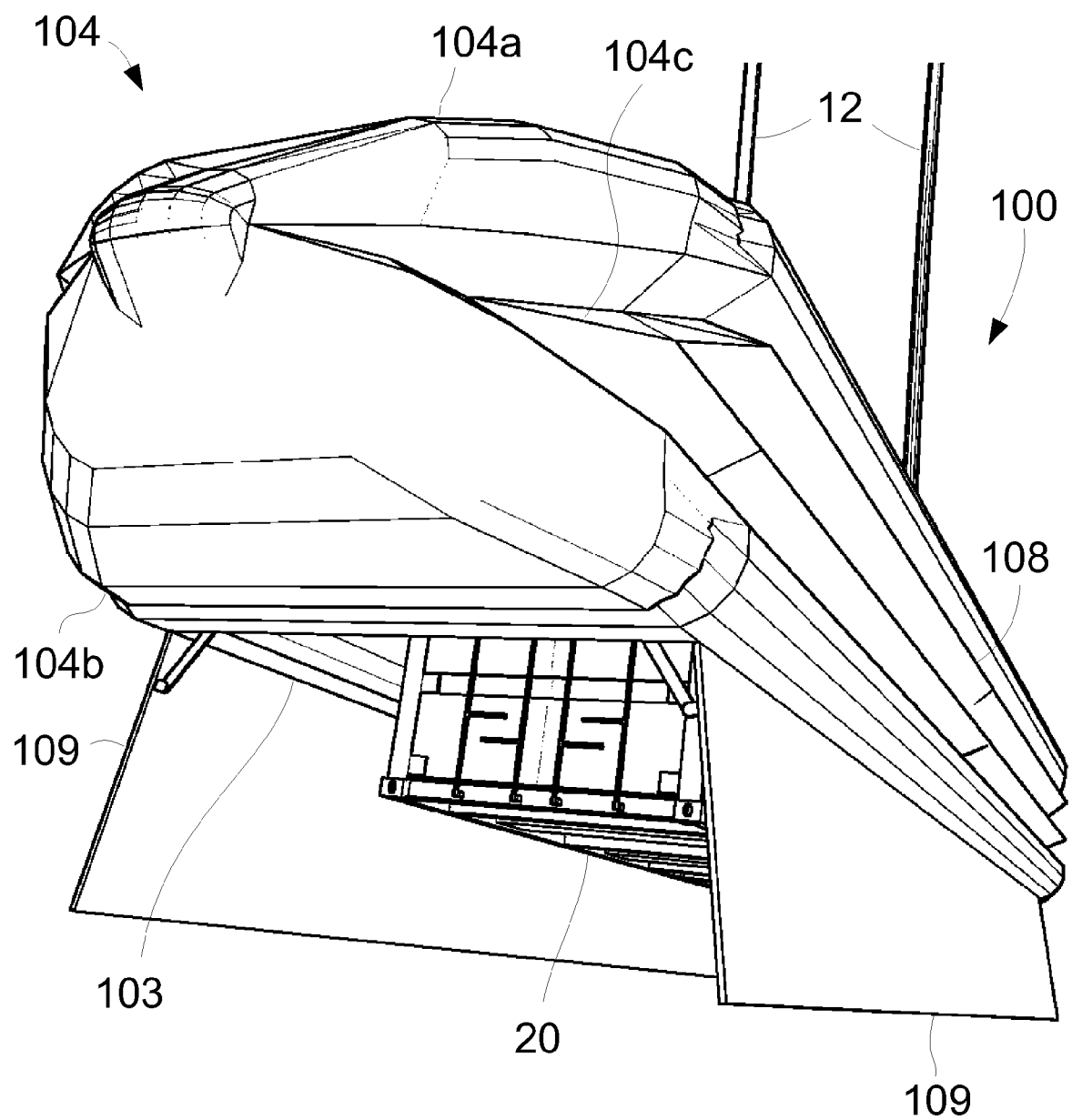

In FIGS. 1D and 3, cargo carrier 20 is secured to support frame 102, and nose and tail cones 104/106 are expanding (FIG. 3) or in their expanded configurations (FIG. 1D). Expansion of nose and tail cones 104/106 results in downward movement of structural frame 103 and unfolding or expanding of side panels 108. With nose and tail cones 104/106 expanded, flexible side panels 108 unfolded, and cargo doors 109 closed, cargo carrier 20 is substantially completely enveloped within an aerodynamic enclosure by apparatus 100 (FIGS. 1D and 1E). Expanded side panels 108, top panel 101, and closed cargo doors 109 form a fuselage portion of the enclosure. The aerodynamic enclosure facilitates passage through the air of cargo carrier 20 during the flight of aircraft 10 (as in FIG. 1E).

Upon reaching a desired destination, cargo doors 109 are opened, nose and tail cones 104/106 are collapsed, and cargo carrier 20 is lowered to the ground. Support frame 102 is disengaged from cargo carrier 20, and aircraft 10 can fly away with cargo-carrying apparatus 100, leaving cargo carrier 20 behind. Alternatively, cargo carrier 20 can be set down, then aircraft 10 can land forward or aft of support frame 102, and then support frame 102 can be released from cargo carrier 20. If multiple cargo carriers are attached to the support frame, each can be released individually at the same destination or at multiple destinations.

Cargo doors 109 are shown in the drawings as a pair of rigid doors connected to lower structural frame 103 by hinges. Cargo doors 109 are open while cargo carrier 20 is positioned and secured to support frame 102. After nose and tail cones 104/106 are expanded, cargo doors 109 can be closed beneath cargo carrier 20. In other examples, a single rigid cargo door can be used, or one or more flexible cargo doors can be used. If flexible, the cargo door can comprise multiple panels of rigid material connected at folding joints, one or more sheets of flexible material, a rollup-type door, or combinations thereof. Likewise, folding side panels 108 can comprise multiple panels of rigid material connected at folding joints, one or more sheets of flexible material, rollup-type panels, or combinations thereof. Top panel 101 can comprise a rigid panel secured to or integral with support frame 102, or can comprise one or more rigid or flexible panels secured to support frame 102. Rigid doors or panels can comprise metal, wood, fiberglass, plastics or polymer resins, composite materials, or any other suitably rigid material. Lighter weight materials are typically preferred if otherwise suitable. Flexible sheets can comprise any of a wide variety of suitable materials, including but not limited to: plain or coated fabric or cloth; plastic, rubber, or other polymer; or woven fibers, such as metal, carbon, glass, and so forth. Flexible sheets can have rigid frames or support beams. Although the exemplary embodiment includes an aerodynamic enclosure having a substantially rectangular transverse cross section, other cross sectional shapes can be employed, e.g., circular, elliptical, polygonal, or irregular.

Figure 2:
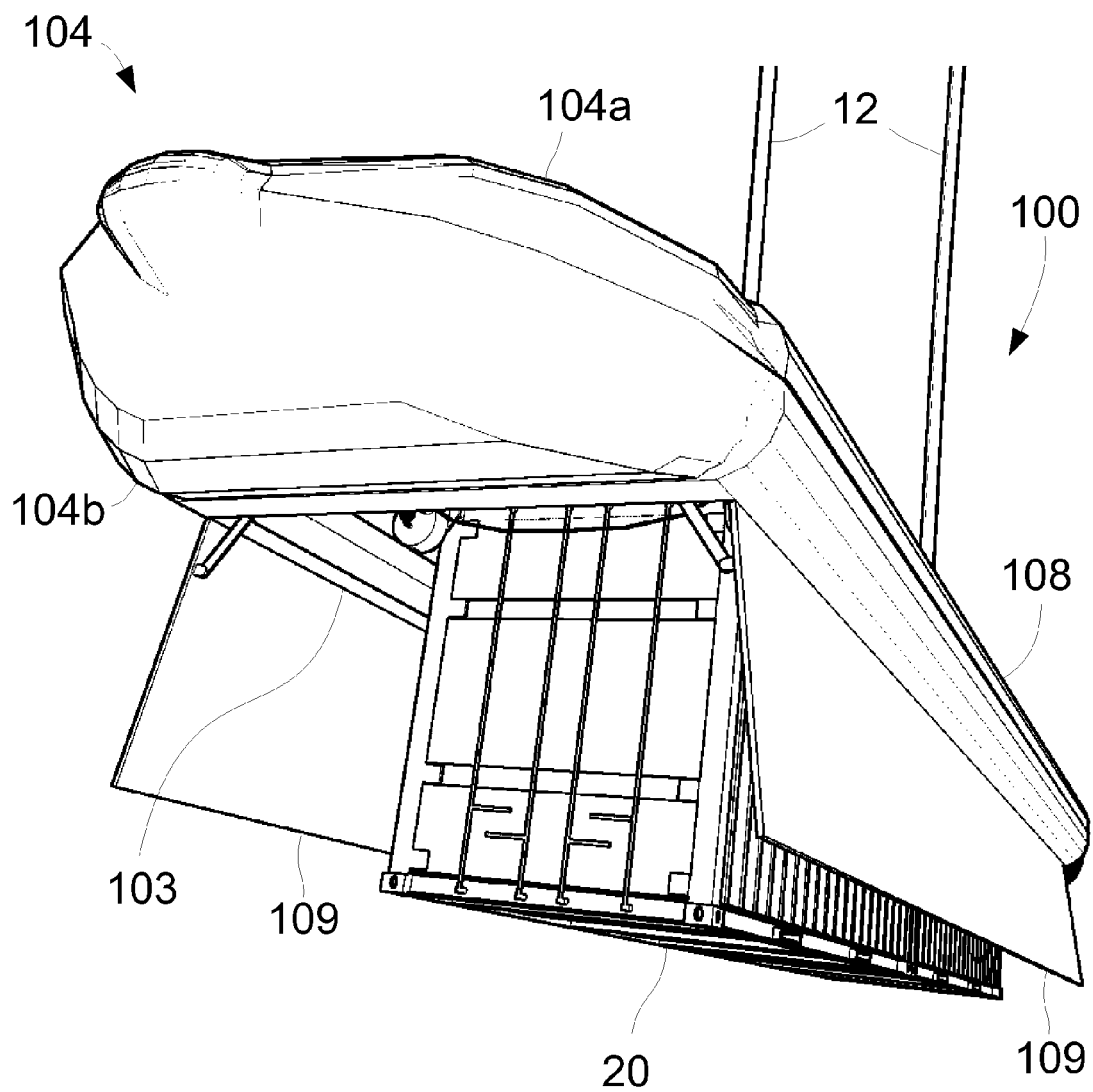
FIGS. 2 and 3 illustrate schematically an exemplary sequence of envelopment of an airborne cargo carrier.
Figure 4:
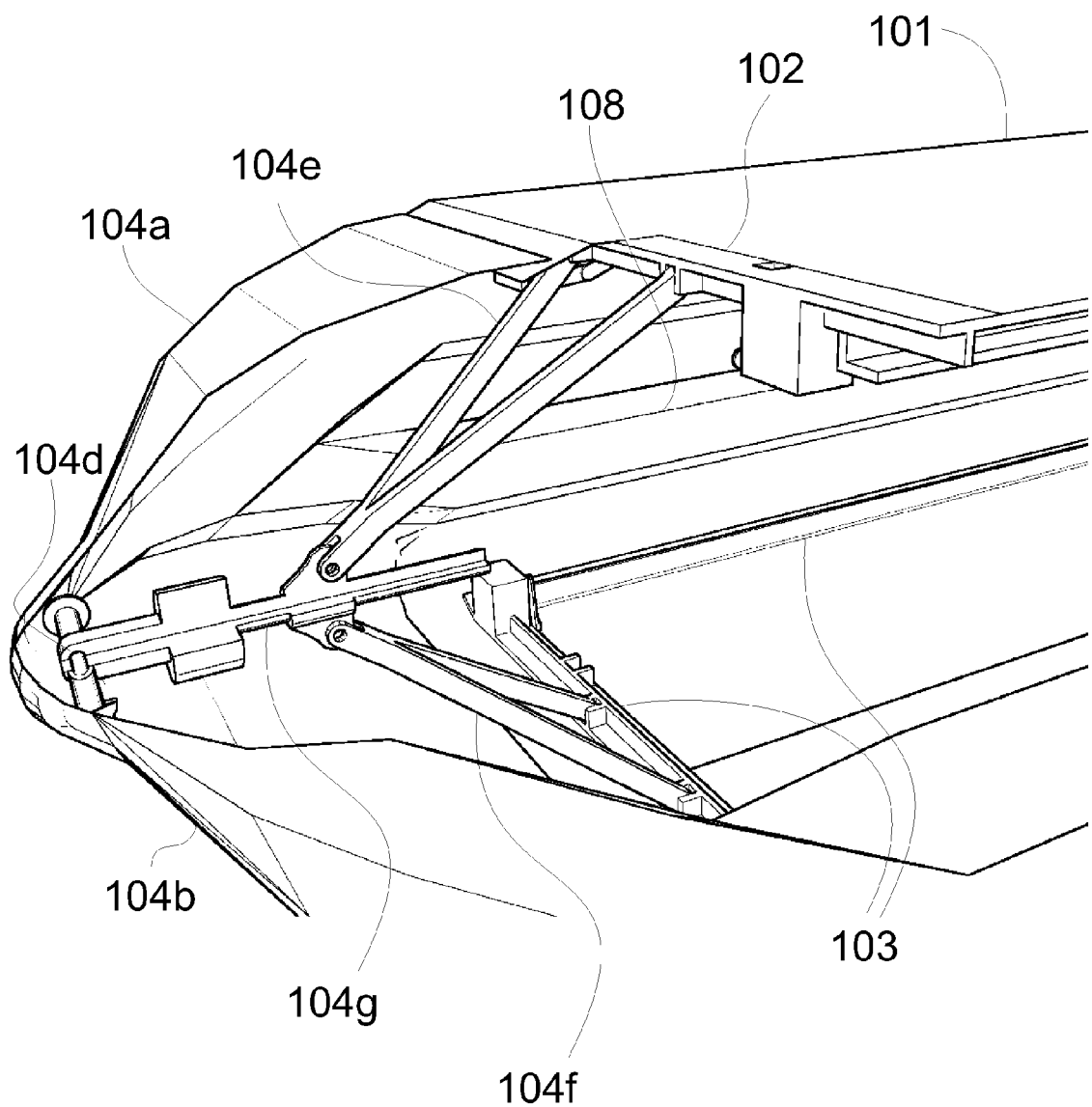
FIG. 4 illustrates schematically a cut-away view of an exemplary mechanism for expanding and collapsing a nose or tail cone.

In the exemplary embodiment shown in the drawings, nose cone 104 and tail cone 106 each comprise a bivalve-type arrangement, with top and bottom halves joined by a hinge at the distal end of the respective cone (i.e., the front end of node cone 104; the rear end of tail cone 106). Other functionally equivalent arrangements can be employed and shall fall within the scope of the present disclosure or appended claims; the bivalve arrangement is shown and described only as a specific example, and shall not be construed as limiting. The bivalve arrangement of nose cone 104 is shown in FIGS. 2-4 and described below; the arrangement of tail cone 106 is analogous. Nose and tail cones can be the same size and shape, or can differ in size or shape. Although referred to as "cones," nose and tail cones 104/106 need not be cones in the strict geometric sense, or even necessarily uniformly convex. Any shape, surface features, or surface textures can be employed for nose and tail cones 104/106 that reduces aerodynamic drag on cargo carrier 20 as it is suspended from aircraft 10 in flight.

Bivalve nose cone 104 comprises top and bottom halves 104a and 104b, respectively, joined by a hinge 104d at the front end of the nose cone. Although referred to as "halves," cone halves 104a/104b need not be the same size or shape; in some instances it can be advantageous if they are the same size and shape, while in other instances it can be advantageous if they differ in size or shape. Cone halves 104a/104b are folded together when nose cone 104 is in its collapsed configuration (FIG. 2). As nose cone 104 expands (FIG. 3), cone halves 104a/104b rotate away from one another about hinge 104d (FIG. 4), causing lower structural frame 103 (coupled to cone bottom half 104b) to move downward away from support frame 102 (coupled to cone top half 104a). Flexible cone side panels 104c connect cone halves 104a/104b and unfold as the cone halves rotate away from one another; each cone side panel 104c is typically connected to or integral with the corresponding side panel 108. Nose and tail cones 104/106 typically expand and collapse synchronously.

Cone halves 104a/104b can each comprise a self-supporting substantially rigid shell, or can comprise one or more panels, rigid or flexible, mounted on or integrally formed with a substantially rigid frame. Whether rigid or flexible, cones halves 104a/104b can comprise materials or arrangements already described above for top panel 101, side panels 108, or cargo door 109. Similarly, cone side panels 104c can comprise materials or arrangements already described above for side panels 108 or cargo door 109.

Water-proof or water resistant materials can be advantageously employed, if desired, for forming top panel 101, nose and tail cones 104/106, side panels 108, or cargo doors 109. Such materials can serve to protect cargo carrier 20 from wind, rain, or other weather, for example. In such examples, joints or borders between those elements can be provided with suitable seals, gaskets, or other adaptations to keep wind or water out of the aerodynamic enclosure. Top panel 101, nose and tail cones 104/106, side panels 108, or cargo doors 109 can be adapted so that the interior of the aerodynamic enclosure can be pressurized, if desired. Air pressure can be maintained by a continual supply of positive air flow to the enclosure (supplied by aircraft 10 or by an onboard air supply), or air pressure can be maintained without supplied air if the aerodynamic enclosure is sufficiently airtight. Pressurization might be desirable, e.g., for supporting flexible top panel 101, nose or tail cones 104/106, side panels 108, or cargo doors 109, or if cargo carrier 20 is employed to carry personnel. Pressurization using a continuous air supply would be preferred in the case where personnel are being carried. If desired, the temperature within the aerodynamic enclosure can be maintained within a desired range using any suitable heating or cooling elements or temperature sensing or control hardware or software. If desired, the interior of the aerodynamic enclosure can be provided with lighting, or one or more of side panels 108 or top panel 101 can include a transparent or translucent portion to admit ambient light.

In some examples of cargo-carrying apparatus 100, nose and tail cones 104/106 can be expanded or collapsed manually, or cargo doors 109 can be opened or closed manually. A locking or retaining mechanism can be employed to maintain the cone or door in the desired configuration (collapsed versus expanded for the cones; open versus closed for the doors). Any suitable locking or retaining mechanism can be employed, e.g., pins, latches, bolts, over-center mechanisms, clasps, or hasps. In other examples of apparatus 100, mechanized actuators can be employed for expanding or collapsing nose and tail cones 104/106 or for opening or closing cargo doors 109. Any suitable mechanized actuators or combinations of actuators can be employed using any suitable power source (onboard apparatus 100 or on aircraft 10), e.g., hydraulic pistons, electric motors, jack screws, gears, or levers. If mechanized actuators are employed, the actuator can in some instances also serve as a locking or retaining mechanism to keep the cone or door in a desired configuration or position.

A specific example of an arrangement for mechanized actuation and retention of nose cone 104 is described below and shown in FIG. 4; an analogous arrangement can be employed for tail cone 106. The arrangement of FIG. 4 is shown and described only as a specific example and shall not be construed as limiting; other functionally equivalent arrangements can be employed and fall within the scope of the present disclosure or appended claims. Upper and lower A-frames 104e/104f are connected by hinges to support frame 102 and lower structural frame 103, respectively. The ends of A-frames 104e/104f are connected together by another hinge that is, in turn, threadedly engaged with jack screw 104g. The front end of jack screw 104g is coupled to hinge 104d. As jack screw 104g rotates, the ends of A-frames 104e/104f move away from hinge 104d and cone halves 104a/104b are forced to rotate apart about hinge 104d, thus expanding nose cone 104 and vertically separating support frame 102 and lower structural frame 103. Rotation of jack screw 104g in the other direction to causes the ends of A-frames 104e/104f to move toward hinge 104d, nose cone 104 to collapse, and support frame 102 and lower structural frame 103 to move toward one another. When not rotating, jack screw 104g maintains nose cone 104 in the corresponding configuration.

Figure 5:
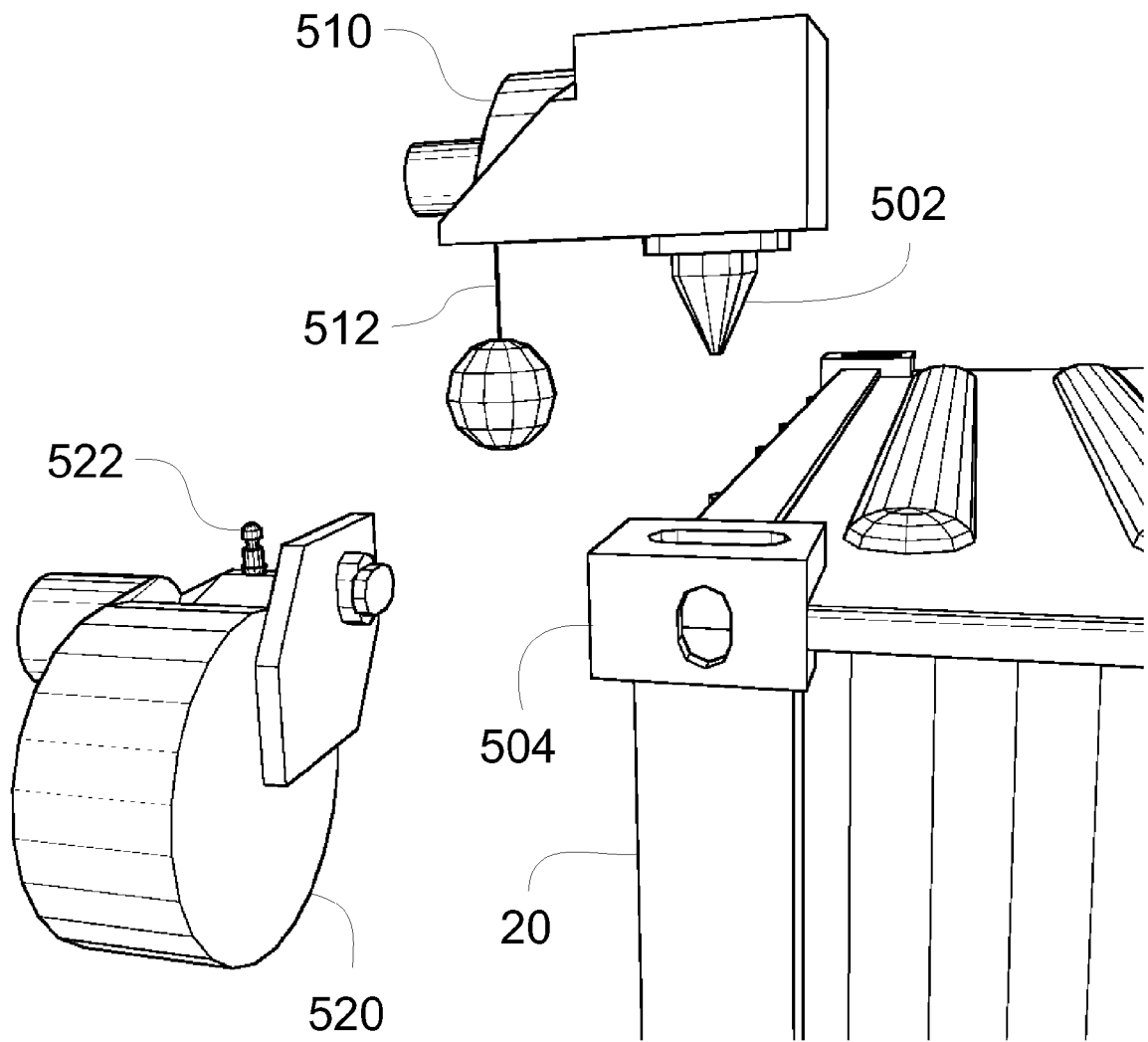
FIG. 5 illustrates schematically exemplary retaining mechanism, cargo carrier, and winches.
Figure 6:
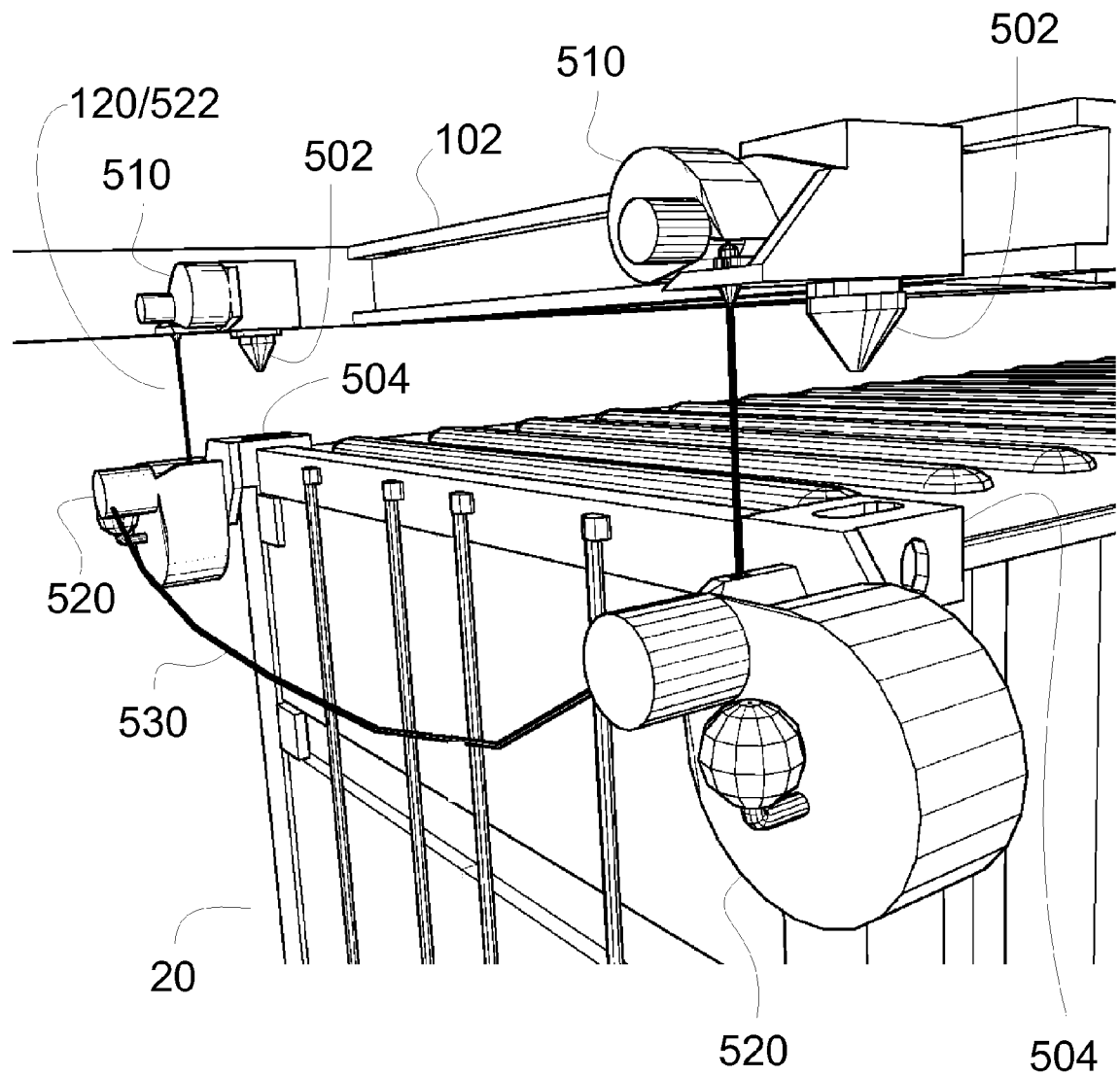
FIG. 6 illustrates schematically exemplary retaining mechanism, cargo carrier, and winches.
Figure 7:
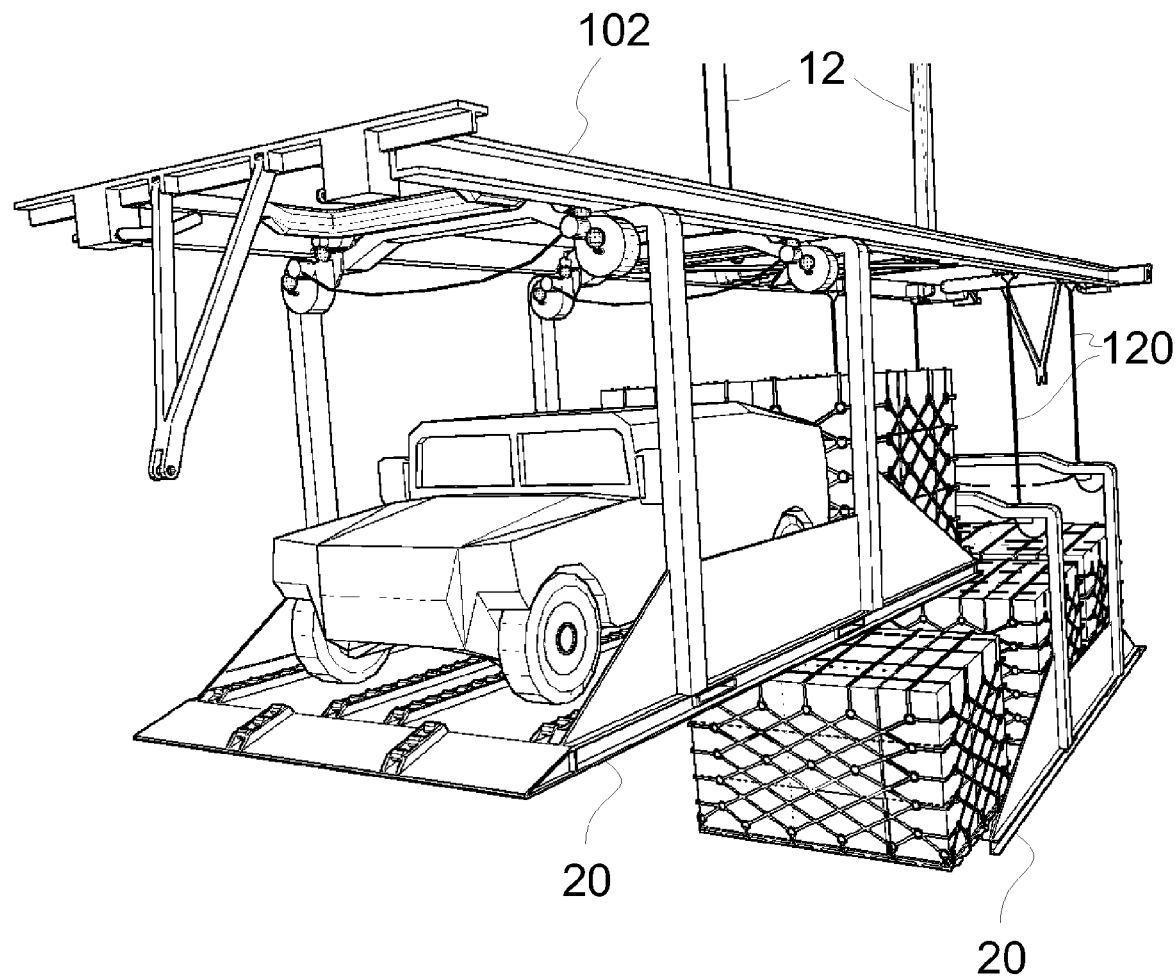
FIG. 7 illustrates schematically alternative exemplary cargo carriers.

One example of a locking mechanism employed to secure cargo carrier 20 to support frame 102 is shown in FIGS. 5 and 6. So-called "bayonet twistlocks" 502 are attached to support frame 102 in positions suitable for engaging mating receptacles 504 on cargo carrier 20, thereby securing together support frame 102 and cargo carrier 20. Bayonet twistlocks can be advantageously employed when ISO-standard cargo containers are to be carried, because those containers are provided with suitable receptacles 504 of a standard size, type, and placement. For example, eight bayonet twistlocks can be arranged on support frame 102 to engage mating receptacles on a pair of 20-foot ISO containers or MILVANs, or four of those bayonet twistlocks can be arranged on support frame 102 to engage mating receptacles on a single 40-foot ISO container. Other types of cargo carriers (e.g., containers, platforms, or carriers) can have an arrangement of receptacles similar to that of an ISO cargo container, enabling such carriers to be secured to a support frame 102 adapted for carrying ISO containers. In some examples, if multiple smaller cargo carriers 20 are employed, each one can be secured to, carried by, or detached from support frame 102 independently of the others. Locking mechanisms can be employed that include pairs of corresponding mechanisms on support frame 102 and on cargo carrier 20 (e.g., the bayonet twistlocks described above, eye and hook, nut and bolt, or probe and orifice), or that include mechanisms on only one or the other of support frame 102 or cargo carrier 20 (e.g., straps, lashing, or netting secured only to support frame 102 and deployed around cargo carrier 20). Any suitable or desired type, number, or arrangement of locking mechanism can be employed for securing together support frame 102 and cargo carrier 20 of any suitable type, and any such mechanism falls within the scope of the present disclosure or appended claims.

In some embodiments, cables 120 are employed to position support frame 102 over cargo carrier 20 so that they can be secured together. In one example (see FIGS. 5 and 6), support frame 102 is provided with winches 510 and corresponding messenger cables 512 (see FIG. 5), and cargo carrier 20 (of any suitable type) is provided with corresponding winches 520 and haul-down cables 522 (see FIG. 6). As aircraft 10 hovers above cargo carrier 20, winches 510 lower messenger cables 512 to cargo carrier 20. Haul-down cables 522 are connected to corresponding messenger cables 512, which are then retracted by winches 510 to pull haul-down cables 522 up to support frame 102. Haul-down cables 522 (now serving as cables 120 of FIG. 1B) are secured to support frame by any suitable mechanism or arrangement and then retracted by winches 520.

Depending on the load capacities of winches 520 and haul-down cables 522, retraction of the haul-down cables can pull support frame 102 (and aircraft 10 along with it) downward to cargo carrier 20 as its remains on the ground, or can lift cargo carrier 20 off of the ground and up to support frame 102.

Power for winches 522 can be provided by a power supply onboard cargo carrier 20 or onboard cargo-carrying apparatus 100, or power can be supplied by aircraft 10 through a dedicated power cable or through one or more of haul-down cables 522. In some examples of the latter configuration, an auxiliary cable 530 can connect two or more of winches 520 to complete an electrical circuit through two or more of haul-down cables 522.

Winches 520 can be provided as a component of cargo carrier 20, or they can be temporarily provided and attached to cargo carrier 20 and removed after cargo carrier 20 is secured to support frame 102 or after cargo carrier 20 is separated from support frame 102 after delivery to its intended destination. In one example, such temporary winches 520 can be provided by airdrop from aircraft 10. Any other suitable arrangement of winches and cables can be employed within the scope of the present disclosure or appended claims. For example, cables 120 and corresponding winches can be provided on support frame 102 only, with cables being lowered from support frame 102 and connected to cargo carrier 20 by any suitable means. In another example, the lower ends of cables 120 can be connected to an intermediate frame (not shown) that is arranged to mate with cargo carrier 20.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof shall be construed as open ended terminology, with the same meaning as if the phrase "at least" were appended after each instance thereof. For purposes of the present disclosure and appended claims, the term "a" means "one or more."

What is claimed is:

1. An apparatus for carrying airborne cargo, the apparatus comprising:
    (a) a support frame suspended from an aircraft and including a top panel;
    (b) a retaining mechanism arranged on the support frame configured to engage a cargo carrier;
    (c) a collapsible nose cone coupled to a front end of the support frame;
    (d) a lower structural frame coupled to the nose cone;
    (e) flexible side panels, each side panel being connected to corresponding sides of the support frame and lower structural frame and coupled to the nose cone; and
    (f) a cargo door mounted on the lower structural frame,
    (g) wherein the nose cone, top panel, and side panels, when arranged with the nose cone collapsed, the side panels folded, and the cargo door open, enable the support frame and the cargo carrier to be relatively positioned in a secured-together fashion with the retaining mechanism engaged, and (h) wherein the nose cone, top panel, side panels, and cargo door, when arranged with the nose cone expanded, the side panels unfolded, and the cargo door closed, substantially envelop the cargo carrier secured to the support frame within an aerodynamic enclosure.

2. The apparatus of claim 1 further comprising a collapsible tail cone coupled to a rear end of the support frame and a rear end of the lower structural frame, wherein the flexible side panels are coupled to the tail cone and the tail cone forms a portion of the aerodynamic enclosure.

3. The apparatus of claim 2 wherein the tail cone includes an aerodynamic stabilization structure.

4. The apparatus of claim 2 wherein each of the nose and tail cones comprises corresponding top and bottom cone halves joined together at their respective distal portions by a corresponding hinge.

5. The apparatus of claim 4 wherein each of the nose and tail cones comprises a corresponding jack screw coupled to the hinge and corresponding top and bottom A-frames pivotably connected at their respective distal ends to each other and to a member threadedly engaged to the corresponding jack screw, wherein proximal ends of the top and bottom A-frames are pivotably connected to ends of the support frame and lower structural frame, respectively.

6. The apparatus of claim 2 wherein the interior of the aerodynamic enclosure is pressurized.

7. The apparatus of claim 2 wherein the top panel, side panels, cargo door, nose cone, or tail cone comprises fabric.

8. The apparatus of claim 1 wherein the retaining mechanism includes a plurality of locking mechanisms arranged to engage receptacles of an ISO-standard shipping container.

9. The apparatus of claim 1 further comprising a plurality of cables and corresponding winches arranged so as to guide the support frame and cargo carrier to be relatively positioned in a secured-together fashion with the retaining mechanism engaged.

10. A method for carrying airborne cargo, the method comprising:
(a) positioning over a cargo carrier, a support frame with a collapsed collapsible nose cone, folded flexible side panels, and an open cargo door,
   (i) wherein the support frame is suspended from an aircraft and includes a top panel,
   (ii) wherein the nose cone is coupled to front ends of the support frame and a lower structural frame,
   (iii) wherein the side panels are connected to sides of the support and structural frames and coupled to the nose cone, and
   (iv) wherein the cargo door is mounted on the lower structural frame;
(b) engaging a retaining mechanism on the support frame with a cargo carrier to secure the cargo carrier to the support frame; and
(c) substantially enveloping within an aerodynamic enclosure the cargo carrier secured to the support frame, by expanding the nose cone, unfolding the flexible side panels, and closing the cargo door.

11. The method of claim 10 further comprising thereafter:
(d) exposing the cargo carrier by opening the cargo door, collapsing the nose cone, and folding the flexible side panels;
(e) disengaging the retaining mechanism on the support frame from the cargo carrier to release the support frame from the cargo carrier; and
(f) removing the support frame from the cargo carrier.

12. The method of claim 10 wherein a collapsible tail cone is coupled to a rear end of the support frame and a rear end of the lower structural frame, and wherein the flexible side panels are coupled to the tail cone and the tail cone forms a portion of the aerodynamic enclosure.

13. The method of claim 12 wherein the tail cone includes an aerodynamic stabilization structure.

14. The method of claim 12 wherein each of the nose and tail cones comprises corresponding top and bottom cone halves joined together at their respective distal portions by a corresponding hinge.

15. The method of claim 14 wherein each of the nose and tail cones comprises a corresponding jack screw coupled to the hinge and corresponding top and bottom A-frames pivotably connected at their respective distal ends to each other and to a member threadedly engaged to the corresponding jack screw, wherein proximal ends of the top and bottom A-frames are pivotably connected to ends of the support frame and lower structural frame, respectively.

16. The method of claim 12 wherein the interior of the aerodynamic enclosure is pressurized.

17. The method of claim 12 wherein the top panel, side panels, cargo door, nose cone, or tail cone comprises fabric.

18. The method of claim 10 wherein engaging the retaining mechanism includes engaging receptacles of an ISO-standard shipping container with a plurality of locking mechanisms on the support frame.

19. The method of claim 10 further comprising employing a plurality of cables and corresponding winches to guide the support frame and the cargo carrier to be relatively positioned in a secured-together fashion with the retaining mechanism engaged.

* * * * *